(12) United States Patent
Zhang

(10) Patent No.: US 7,723,274 B2
(45) Date of Patent: May 25, 2010

(54) METHOD FOR MAKING PARTICULATE SLURRIES AND PARTICULATE SLURRY COMPOSITIONS

(75) Inventor: Kewei Zhang, Calgary (CA)

(73) Assignee: Trican Well Service Ltd., Calgary, Alberta (CA)

( * ) Notice: Subject to any disclaimer, the term of this patent is extended or adjusted under 35 U.S.C. 154(b) by 484 days.

(21) Appl. No.: 11/416,704

(22) Filed: May 2, 2006

(65) Prior Publication Data

US 2007/0015669 A1 Jan. 18, 2007

Related U.S. Application Data

(60) Provisional application No. 60/676,316, filed on May 2, 2005, provisional application No. 60/719,597, filed on Sep. 23, 2005.

(51) Int. Cl.
*C02F 5/08* (2006.01)
(52) U.S. Cl. ........................ 507/234; 210/679
(58) Field of Classification Search ................ 507/234; 210/679
See application file for complete search history.

(56) References Cited

U.S. PATENT DOCUMENTS

| | | | |
|---|---|---|---|
| 4,046,795 A | 9/1977 | Martin | |
| 4,183,814 A | 1/1980 | Ramachandran | |
| 4,231,428 A | 11/1980 | Needham et al. | |
| 4,454,056 A | 6/1984 | Kittelmann et al. | |
| 4,512,405 A * | 4/1985 | Sweatman et al. | 166/278 |
| 4,537,595 A | 8/1985 | Gruning et al. | |
| 4,564,456 A | 1/1986 | Homan | |
| 4,654,161 A | 3/1987 | Kollmeier et al. | |
| 4,689,085 A | 8/1987 | Plueddemann | |
| 4,891,166 A | 1/1990 | Schaefer et al. | |
| 4,898,957 A | 2/1990 | Plueddemann et al. | |
| 4,933,327 A | 6/1990 | Plueddemann et al. | |
| 4,960,845 A | 10/1990 | O'Lenick, Jr. | |
| 5,098,979 A | 3/1992 | O'Lenick, Jr. | |
| 5,149,765 A | 9/1992 | O'Lenick, Jr. | |
| 5,166,297 A | 11/1992 | O'Lenick, Jr. | |
| 5,209,775 A | 5/1993 | Bank et al. | |
| 5,235,082 A | 8/1993 | Hill et al. | |
| 5,240,760 A | 8/1993 | George et al. | |
| 5,256,805 A | 10/1993 | O'Lenick, Jr. | |
| 5,292,908 A * | 3/1994 | Onikata et al. | 556/173 |
| 5,306,434 A | 4/1994 | Schueller et al. | |
| 5,359,104 A | 10/1994 | Higgs et al. | |
| 5,474,835 A | 12/1995 | McCarthy et al. | |
| 5,616,758 A | 4/1997 | McCarthy et al. | |
| 5,643,672 A * | 7/1997 | Marchi et al. | 428/402 |
| 5,653,794 A * | 8/1997 | Weber et al. | 106/442 |
| 5,798,144 A | 8/1998 | Varanasi et al. | |
| 5,824,226 A * | 10/1998 | Boyd et al. | 210/679 |
| 6,047,772 A | 4/2000 | Weaver et al. | |
| 6,060,521 A | 5/2000 | Sekutowski et al. | |
| 6,132,638 A | 10/2000 | Oldenhove | |
| 6,277,361 B1 | 8/2001 | Murray | |
| 6,323,268 B1 | 11/2001 | Fisher et al. | |
| 6,403,163 B1 | 6/2002 | Fisher et al. | |
| 6,482,969 B1 | 11/2002 | Helmrick et al. | |
| 6,524,597 B2 | 2/2003 | Kashimoto | |
| 6,696,052 B2 | 2/2004 | Aeby et al. | |
| 6,830,811 B2 | 12/2004 | Chao | |
| 2004/0023818 A1 | 2/2004 | Nguyen et al. | |
| 2005/0187112 A1* | 8/2005 | Goodhue et al. | 507/117 |

FOREIGN PATENT DOCUMENTS

| | | |
|---|---|---|
| CA | 1071076 A1 | 10/1975 |
| CA | 1104804 A | 12/1978 |
| CA | 2408052 | 8/2001 |
| CA | 2329600 A1 | 6/2002 |
| CA | 2423031 A1 | 1/2003 |
| CA | 2423031 | 10/2003 |
| CA | 2213168 | 1/2005 |
| CA | 2545563 | 11/2006 |
| GB | 1584831 | 2/1981 |
| GB | 2387191 A | 10/2003 |
| JP | 58146434 | 9/1983 |
| JP | 58146434 | 9/2007 |
| WO | WO 02/22759 A1 | 3/2002 |
| WO | WO 2005/100007 | 10/2005 |
| WO | WO 2006/116868 | 11/2006 |
| WO | WO 2007/033489 | 3/2007 |

OTHER PUBLICATIONS

Spheriglass Solid Glass Spheres by Potters Industries Inc. 2001.*

* cited by examiner

*Primary Examiner*—Timothy J. Kugel
*Assistant Examiner*—Atnaf Admasu
(74) *Attorney, Agent, or Firm*—Dunlap Codding, P.C.

(57) ABSTRACT

An aqueous slurry composition for use in industries such as the petroleum and pipeline industries includes a particulate, an aqueous liquid and a chemical compound that renders the particulate surface extremely hydrophobic. The slurry is produced by rendering the surface of the particulate extremely hydrophobic during or before making the slurry.

40 Claims, No Drawings

METHOD FOR MAKING PARTICULATE SLURRIES AND PARTICULATE SLURRY COMPOSITIONS

CROSS REFERENCE TO RELATED APPLICATIONS

This application claims the benefit under 35 U.S.C. 119(e) of U.S. Provisional Application Ser. No. 60/676,316, filed May 2, 2005, and claims priority from U.S. Provisional Application No. 60/719,597, filed Sep. 23, 2005, the contents of each hereby expressly incorporated by reference in their entirety.

BACKGROUND OF THE INVENTION

1. Field of the Invention

This invention relates to an aqueous slurry composition and to a method of making such a composition.

2. Brief Description of the Prior Art

Aqueous particulate slurries are commonly used or encountered in many industries including the petroleum, pipeline, construction and cleaning industries. Slurries are mixtures normally consisting of particulates and an aqueous liquid and play an essential role in many industrial operations. For example, slurries are used when transporting particulates above ground, from the surface to a subterranean formation or from a subterranean formation to the surface. The most commonly used particulates include sand, ceramic particles, carbonate particles, glass spheres, bauxite (aluminum oxide), resin coated particulates and coal particulates The particulate sizes normally range from about 10 to about 100 US mesh, and the particles have densities significantly higher than the density of water. For example, the density of sand is at about 2.6 g/cm$^3$ while the density of water is 1 g/cm$^3$. Sand is by far the most commonly used particulate.

To make relatively stable slurry, particulates must be suspended in a liquid medium for a lengthy period at static or/and dynamic conditions. Convention wisdom tells us that the viscosity or viscoelasticity of the liquid medium must be sufficiently high to be able to suspend particulates. The most commonly used method for increasing viscosity or viscoelasticity of a liquid medium is by adding a viscosifier, for example, a natural or synthetic polymer or a viscoelastic surfactant to the liquid medium. It is not unusual that a polymer is used with a foaming agent in order to take advantage of both viscoelastic and foaming properties. However, the use of polymers in slurries increases cost and results in operational difficulties. In particular applications, for example, hydraulic fracturing of subterranean formations, the use of polymers in slurry impedes oil and gas production due to large amounts of residue left in the formation. As for viscoelastic surfactants, although they have fewer residues compared to normal polymers, their cost is usually much higher. In many other applications such as gravel-pack, well completion and sand transportation through pipelines, it is highly desirable to make stable particulate slurry without using a viscosifier.

Hydraulic fracturing operations are used extensively in the petroleum industry to enhance oil and gas production. In hydraulic fracturing, a fracturing fluid is injected through a wellbore into a subterranean formation at a pressure sufficient to initiate fracturing, which increases oil and gas production. Frequently, particulates, called proppants, are suspended in a fracturing fluid and transported into a fracture as slurry. Proppants include sands, ceramic particulates, glass spheres, bauxite particulates, resin coated sands and other particulates known in the industry. Among them sand is by far the most commonly used proppant. Fracturing fluids in common use include water-based as well as hydrocarbon-based fluids. In water-based fracturing fluids, a polymer or viscoelastic surfactant is normally employed to increase the viscoelasticity of the fluid. In most case the viscoelastic property of the fluids is essential for transporting proppants deep into a formation. At the last stage of the fracturing treatment, fracturing fluid flows back to the surface and the proppants are left in the fracture forming a proppant pack to prevent the fracture from closing after pressure is released. A proppant-filled fracture provides a highly conductive channel that allows oil and/or gas to seep through more efficiently to the wellbore. The conductivity of the proppant pack plays a dominant role in production enhancement. Polymer residues from fracturing fluids are known to greatly reduce the conductivity of the proppant pack. Compared to polymeric viscosifiers, viscoelastic surfactants cause less damage to formations and proppant packs. However, they are much more expensive. Accordingly, a need exists for a composition for efficiently transporting proppants deep into a formation at low cost while at the same time causing little damage to the formation and proppant pack. Grain size, concentration, and the packing pattern of proppants are also important factors in determining the conductivity. Despite extensive research in recent years, limited progress has been achieved to maximize the conductivity of a proppant pack in a fracture. Therefore, a need exists for making a composition for use in a proppant pack with improved conductivity.

Proppant flowback after fracturing treatments has long been plaguing the petroleum industry. Flowback reduces the amount of proppants in the formation leading to a less conductive fracture. As disclosed, for example in U.S. Pat. No. 6,047,772, various methods have been tried to solve the flowback problem. In one method, resins are used to coat the proppant and make them very tacky. In doing so, the proppant grains tend to agglomerate reducing flowback. This method is not only expensive, but the tacky resins introduced in the proppant pack tend to reduce its conductivity. Therefore, there is a need for a composition and method for making slurry, which can form a stable proppant pack, which resists proppant flowback while at the same time has a high conductivity.

When drilling subterranean formations for oil and gas, aqueous-based drilling fluids are normally used. During drilling large amounts of particles, called cuttings are generated. Cuttings have different sizes ranging from fines to pebbles. The drilling fluid is circulated through the wellbore to make slurry with the cuttings in situ and transports them out of wellbore. In most cases, polymers as well as clays are added to the drilling fluids to increase their viscosity/viscoelasticity in order to transport the cuttings efficiently. However, polymers as well as clay fines, can easily penetrate pores or thin fractures in a formation and reduce formation permeability significantly, especially near a wellbore. Reduced formation permeability impedes oil and/or gas production. Therefore it is highly desirable to provide a drilling fluid that can make stable slurry in situ with the cuttings and transport them out of the wellbore, while causing little formation damage.

The escalating price of oil and its alarming depletion rate have caused people to consider using coal as an oil substitute. Several factors have slowed the substitution of coal for oil. One factor is the difficulty in transporting coal cost-effectively over long distance through pipelines. It is therefore highly desirable to provide a composition for making coal slurry which is stable, highly fluid and cost-effective to transport.

In oil sand operation massive amount of sands are left after oil is stripped from the sand surface. Finding a more cost effective way to transport sands efficiently over distance through pipelines has long been required in the industry. Thus, a composition and a method for making stable and highly fluid sand slurries at low cost would be quite useful.

The object of the present invention is to meet the above defined needs by providing an aqueous slurry composition, which can be used in a stable, highly conductive proppant pack, for efficiently transporting proppants into a subterranean formation, and for use in transporting cuttings, coal and sand.

SUMMARY OF THE INVENTION

Accordingly, the invention relates to an aqueous slurry composition comprising particulates, an aqueous liquid and a chemical compound that renders the surface of the particulates extremely hydrophobic.

The invention also relates to a method of producing an aqueous slurry composition comprising the steps of mixing particulates with an aqueous liquid, and rendering the particulate surface extremely hydrophobic during or before mixing the particulates with the aqueous liquid.

The present invention is based on the discovery that when the surface of the particulates becomes extremely hydrophobic, the slurry has several novel properties. For example, particulates tend to move cohesively instead as individual grains; the bulk volume of settled particulates tend to be significantly greater than in a slurry formed by convention methods under the same conditions; the particulate pack formed tends to have high conductivity and be easily dewatered, and the slurry tends to be fluid and stable without using a viscosifier. The larger bulk volume of the particulate pack indicates a larger porosity and therefore higher conductivity. This is particularly beneficial for improving fracturing treatment, since, as mentioned above, the conductivity of the proppant pack is the dominant property affecting fracturing treatment. The extremely hydrophobic surface of the particulate further reduces the dragging force exerted by the fluid and makes it more difficult for proppants to be carried away by the fluid. This is particularly beneficial for minimizing proppant flowback after fracturing treatments, leading to increased proppant conductivity. In conventional slurry, viscosity or viscoelasticity of the liquid plays the dominant role while the interfacial interactions between the particulate surface and the liquid play negligible role. However it is discovered in the present invention that when the surface of the particulate becomes extremely hydrophobic, the interfacial interactions between the surface and the aqueous liquid become increasingly important, and even can play a dominant role.

In general, the interfacial interactions between a solid substrate and a liquid mainly depend on the surface properties and the surface tension of the liquid. Normally the macroscopic properties of a surface can be characterized by observing the shape of a liquid droplet on the solid substrate, which is the result of free energy of the surface, as well as the free energy of the liquid. When a liquid does not completely wet a surface, it forms an angle θ, which is known as the contact angle. The contact angle is the angle formed between a solid substrate and the tangent line at the point of contact between a liquid droplet and the solid substrate. Contact angle can be measured directly on macroscopic, smooth, nonporous, planar solid substrates by merely placing a droplet of the liquid or solution on the solid substrate and determining the contact angle by any of number of techniques. It is known that majority of natural occurred minerals are water-wet. It is also known that certain hydrocarbon compounds, for example, some conventional quaternary surfactants, amine surfactants and cationic polyacrylamides can be used to reduce the surface energy of certain particulates and make the particulate surface more hydrophobic. However, the "hydrophobicity" imparted by such compounds is not high enough to be included in the term of "extremely high hydrophobicity" as in the case of the present invention. In the present invention, by "extremely hydrophobic" it means that the contact angle of water on the solid substrate is greater than about 90°. The chemical compounds that can render the particulate surface extremely hydrophobic are referred as "extremely hydrophobic rendering compounds" (EHRC). EHRC normally are those compounds that contain organosilane or organosiloxane groups or fluoro-organic groups. Because of such groups, EHRC are able to impart hydrophobicity to solid surface to a level that conventional hydrocarbon surfactants or polymers are not able to achieve.

The slurry can be made on the ground or in situ in a subterranean formation. The slurry finds numerous applications in many industries, including:
(a) transporting particulates over various distances, either on the surface of the ground, from the surface to a subterranean formation or from a subterranean formation to the surface, and
(b) well service operations including stimulation, drilling, completion, gravel-pack, controlling sand production and the like.

DETAILED DESCRIPTION OF THE INVENTION

A gas can be added to the slurry. Suitable gases for use in the slurry include air, carbon dioxide, nitrogen, methane and mixtures thereof. The gas can be introduced into the slurry during preparation thereof. For example, when the slurry is pumped through a pipe at a sufficient rate, gas such as air can be introduced into the slurry. In the present case, by "aqueous liquids" is meant water, salt solutions, water containing an alcohol or other organic solvents, mixtures of water with carbon dioxide and the like. It will be appreciated that the additives other than water in the aqueous liquid are used in amounts or in a manner that does not adversely affect the present invention. The aqueous fluid can also contain polymers which can be linear or cross-linked. For example, in so-called slick-water fracturing, a small amount of polymer is normally added to reduce friction during pumping. The size of particulates in the composition is about 10-100 US mesh, which is about 150 to 1400 µm. It should be understood that the size distribution of particulates can be narrow or wide. Suitable particulates include sand, ceramic, glass beads, bauxite, resin coated sand, carbonates and coal particulates.

There are several approaches to make particulate surfaces extremely hydrophobic. One method is to use certain organosilicon compounds to render the surface of particulates such as sands, ceramic particles, glass spheres and bauxite extremely hydrophobic. The organosilicon compounds include organosiloxane, organosilane, fluoro-organosiloxane and fluoro-organosilane compounds. The organosiloxane compounds include quaternary siloxane compounds including quaternary polydimethyl siloxane or diquaternary polydimethyl siloxane and siloxane amines. The organosilane compounds include alkylchlorosilane, for example methyltrichlorosilane, dimethyldichlorosilane, trimethylchlorosilane, octadecyltrichlorosilane, alkyl-alkoxysilane compounds, for example methyl-, propyl-, isobutyl- and octyltrialkoxysilanes. The fluoro-organosilane compounds include 2-(n-perfluoro-octyl)-ethyltriethoxysilane, and perfluoro-octyldimethyl chlorosilane. Other types of chemical compounds which can be used to render particulate surface extremely hydrophobic are certain fluoro-substituted compounds, for example certain fluoro-organic compounds. Examples are described in U.S. Pat. Nos. 4,564,456; 4,689,085; 5,098,979; 5,209,775; 5,240,760; 5,359,104; 6,132,638 and 6,830,811 and Canadian Patent No. 2,213,168. In some cases, when using the composition described herein, a catalyst might be preferred to speed up the interaction between an EHRC and the particulate surface. For different particulates, certain EHRC may be preferred over others.

There are many types of organosilicon compounds which can be used to impart extreme hydrophobicity to particulate surfaces. One example is an organosilane which can be represented by the formula:

$$R_nSiX_{(4-n)} \quad \text{(I)}$$

wherein R is an organic radical containing 1-50 carbon atoms, X is a halogen, alkoxy, acyloxy or amine containing 1-50 carbon atoms and n has a value of 1-3. Examples of suitable organosilanes include:

$CH_3SiCl_3$, $CH_3CH_2SiCl_3$, $(CH_3)_2SiCl_2$, $(CH_3CH_2)_2SiCl_2$, $(C_6H_5)_2SiCl_2$, $(C_6H_5)SiCl_3$, $(CH_3)_3SiCl$, $CH_3HSiCl_2$, $(CH_3)_2HSiCl$, $CH_3SiBr_3$, $(C_6H_5)SiBr$, $(CH_3)_2SiBr_2$, $(CH_3CH_2)_2SiBr_2$, $(C_6H_5)SiBr_2$, $(CH_3)_3SiBr$, $CH_3HSiBr_2$, $(CH_3)_2HSiBr$, $Si(OCH_3)_4$, $CH_3Si(OCH_3)_3$, $CH_3Si(OCH_2CH_3)_3$, $CH_3Si(OCH_2CH_2CH_3)_3CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2{=}CHCH_2Si(OCH_3)_3$, $(CH_3)_2Si(OCH_3)_2$, $(CH_3)_2Si(OCH_2CH_3)_2$, $(CH_3)_2Si(OCH_2CH_2CH_3)_2$, $(CH_3)_2Si[O(CH_2)_3CH_3]_2$, $(CH_3CH_2)_2Si(OCH_2CH_3)_2$, $(C_6H_5)_2Si(OCH_3)_2$, $(C_6H_5CH_2)_2Si(OCH_3)_2$, $(C_6H_5)_2Si(OCH_2CH_3)_2$, $(CH_2{=}CH_2)Si(OCH_3)_2$, $(CH_2{=}CHCH_2)_2Si(OCH_3)_2$, $(CH_3)_3SiOCH_3$, $CH_3HSi(OCH_3)_2$, $(CH_3)_2HSi(OCH_3)$, $CH_3Si(OCH_2CH_2CH_3)_3$, $CH_2{=}CHCH_2Si(OCH_2CH_2OCH_3)_2$, $(C_6H_5)_2Si(OCH_2CH_2OCH_3)_2$, $(CH_3)_2Si(OCH_2CH_2OCH_3)_2$, $(CH_2{=}CH_2)_2Si(OCH_2CH_2OCH_3)_2$, $(CH_2{=}CHCH_2)_2Si(OCH_2CH_2OCH_3)_2$, $(C_6H_5)_2Si(OCH_2CH_2OCH_3)_2$, $CH_3Si(CH_3COO)_3$, methyldiethylchlorosilane, butyltrichlorosilane diphenyldichlorosilane, vinyltrichlorosilane, methyltrimethoxysilane, vinyltriethoxysilane, vinyltris(methoxyethoxy)silane, methacryloxypropyltrimethoxysilane, glycidoxypropyltrimethoxysilane, aminopropyltriethoxysilane, divinyldi-2-methoxysilane, ethyltributoxysilane, isobutyltrimethoxysilane, hexyltrimethoxysilane, n-octyltriethoxysilane, dihexyldimethoxysilane; trichloro-octadecylsilane and quaternary ammonium silane including 3-(trimethoxysilyl) propyldimethyloctadecyl ammonium chloride, 3-(trimethylethoxysilylpropyl)didecylmethyl ammonium chloride and triethoxysilyl soyapropyl dimonium chloride.

Different polysiloxane compounds can also be useful for the present invention. Polysiloxanes modified with organic cationic or amphoteric groups including organic betaine polysiloxanes and organic quaternary polysiloxanes are examples. One type of betaine polysiloxane or quaternary polysiloxane is represented by the formula:

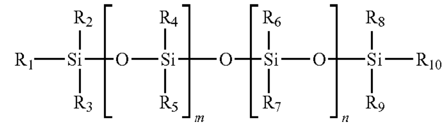

(II)

wherein each of the groups $R_1$ to $R_6$, and $R_8$ to $R_{10}$ represents an organic radical containing 1-6 carbon atoms, typically a methyl group, $R_7$ represents an organic betaine group for betaine polysiloxane, for example betaine polysiloxane copolyol, or an organic quaternary group for quaternary polysiloxane, and may contain a hydroxyl group or other functional groups containing N, P or S, and have different numbers of carbon atoms, and m and n are from 1 to 200. For example when $R_7$ is an organic quaternary group it can be represented by the group:

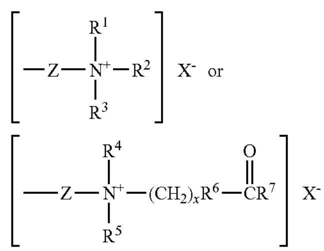

wherein $R^1$, $R^2$, $R^3$ are alkyl groups with 1 to 22 carbon atoms or alkenyl groups with 2 to 22 carbon atoms. $R^4$, $R^5$, $R^6$ are alkyl groups with 1 to 22 carbon atoms or alkenyl groups with 2 to 22 carbon atoms; $R^6$ is —O— or the $NR^8$ group, $R^8$ being an alkyl or hydroxyalkyl group with 1 to 4 carbon atoms or a hydrogen group; Z is a bivalent hydrocarbon group with at least 4 carbon atoms, which may have a hydroxyl group and may be interrupted by an oxygen atom, an amino group or an amide group; x is 2 to 4; The $R^1$, $R^2$, $R^3$, $R^4$, $R^5$, $R^6$ may be the same or the different, and $X^-$ is an inorganic or organic anion. Such compounds are commercial available from Degussa Corporation and Dow Corning Corporation.

Other example of organo-modified polysiloxanes include di-betaine polysiloxanes and di-quaternary polysiloxanes, which can be represented by the formula:

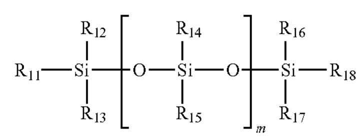

(III)

wherein the groups $R_{12}$ to $R_{17}$ each represents an organic radical containing 1-6 carbon atoms, typically a methyl group, both $R_{11}$ and $R_{18}$ group represent an organic betaine group for di-betaine polysiloxanes or an organic quaternary group for di-quaternary, for example Quaternium 80 (INCl), and may contain a hydroxyl group or other functional groups containing N, P or S, and have different numbers of carbon atoms, and m is from 1 to 200. For example when $R_{11}$ and $R_{18}$ is an organic quaternary group it can be represented by the group:

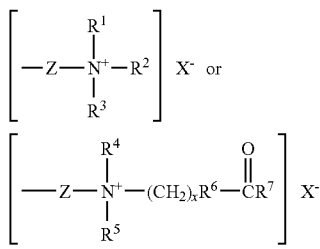

wherein $R^1$, $R^2$, $R^3$, $R^4$, $R^5$, $R^6$, Z, $X^-$ and x are defined above. Such compounds are commercially available from Degussa Corporation or Dow Corning Corporation. It should be apparent to those skilled in the art that there are different mono- and di-quaternary polysiloxanes, mono- and di-betaine polysiloxanes and other organo-modified polysiloxane compounds which can be useful in the present invention. These compounds are widely used in personal care products, for example in U.S. Pat. Nos. 4,054,161; 4,891,166; 5,235,082; 5,306,434; 5,474,835; 5,616,758; 6,277,361 and 6,482,969.

Another example of organosilicon compounds which can be used in the composition of the present invention are fluoro-organosilane or fluoro-organosiloxane compounds in which at least part of the organic radicals in the silane or siloxane compounds are fluorinated. Suitable examples are fluorinated chlorosilanes or fluorinated alkoxysilanes including 2-(n-perfluoro-octyl)ethyltriethoxysilane, perfluoro-octyldimethyl chlorosilane, $(CF_3CH_2CH_2)_2Si(OCH_3)_2$, $CF_3CH_2CH_2Si(OCH_3)_3$, $(CF_3CH_2CH_2)_2Si(OCH_2CH_2OCH_3)_2$ and $CF_3CH_2CH_2Si(OCH_2CH_2OCH_3)_3$.

Other compounds which can be used are fluoro-substituted compounds, for example, certain fluoro-organic compounds.

The slurry according to the present invention can be prepared, for example, by mixing water with the particulates and an EHRC. Normally sufficient shear is needed. Alternatively, the particulates can be first treated by contacting a fluid medium containing an EHRC to cause the particulates to become extremely hydrophobic and then separating the particulates from the medium. The fluid medium can be a liquid or a gas. The hydrophobic particulates can later be used to make slurry. Water is the most preferred aqueous liquid for making the slurry. Certain salts, some conventional hydrocarbon surfactants or polymers can be added to the slurry at concentrations and in a manner which would not adversely affect the slurry. For example, when conventional surfactants, polymers or other additives are added to the slurries, one should try to avoid forming insoluble precipitates with the EHRC, or making large changes to the surface energy of the particulate surface, or greatly reducing the surface tension of the aqueous liquid. In some cases, a very low surface tension of the aqueous liquid is not desirable. When the surface tension of the liquid is too low, more water can be added or some of the aqueous liquid can be replaced with new water.

The slurries can be prepared on surface (above ground) or in a subterranean formation where the particulates, an aqueous fluid, and an EHRC, for example a di-quaternary polysiloxane, are mixed in situ. Examples of situations where in situ mixing is used include drilling and wellbore cleanout operations. Alternatively, the particulates can be first mixed with a liquid in which an EHRC is dispersed or dissolved and then the particulates separated from the liquid or dried. The thus treated particulates can subsequently be used to make the slurry. Various proppants including sands, ceramic particulates or resin coated sands can be treated according to the present invention during manufacturing process. The thus prepared hydrophobic particulates can be used as proppants in fracturing operations. Depending on the amount and size of the particulates in the slurry, a wide range of EHRC concentration can be used to render the particulate surface extremely hydrophobic. Usually the amount of EHRC added is very small and has no apparent effect on the viscosity of the liquid to which it is added. For example, the concentration of EHRC in the slurry can be as low as a few ppm to hundreds of ppm. In most applications, it is unnecessary to add EHRC in an amount larger than 1 percent of the total liquid.

The following examples serve to illustrate the concepts of the present invention:

EXAMPLE 1

50 ml of water and 50 grams of 20/40 mesh fracturing sands were added into each of two glass bottles (200 ml). 0.5 ml of Tegopren 6923, a di-quaternary ploysiloxane from Degussa Corp., was added into one of the bottles and the other bottle was used as control. The bottles were vigorously shaken and then let stand to allow sands settle down. The volumes of the settled sands in the two bottles were compared. In the bottle containing Tegopren 6923, the volume of the settled sands was about 40 percent greater than the one without. When the bottles were tilted, the settled sands in the bottle with straight water fended to move as individual sand grains, while the settled sands containing Tegopren 6923 tended to move as cohesive masses.

EXAMPLE 2

50 ml water, 50 grams of 20/40 mesh fracturing sands, 0.5 ml of Tegopren 6923 and 0.01 ml of Aquard 18-50, a hydrocarbon quaternary ammonium salt from Akzo Nobel Corp., was mixed into a glass bottle (200 ml). The bottles were vigorously shaken and then let stand to allow sands settle down. The sand grains immediately following agitation were fully distributed in water making stable slurry. After one hour, about half amount of sands settled down to the bottom while the other half was floating on the top.

EXAMPLE 3

100 ml of water and 50 grams of 20/40 mesh ceramic proppants were added into each of two glass bottles (200 ml). 0.5 ml of TEGO Betaine 810, a capryl/capramidopropyl betaine from Degussa Corp., and 1 ml of a solution containing 20% Tegopren 6924, a di-quaternary ploysiloxane from Degussa Corp., and 80% of ethylene glycol mono-butyl ether were added into one of the bottles, and the other bottle was used as control. The bottles were vigorously shaken and then let stand to allow proppants settle down. In the one containing Tegopren 6924 about 25% of proppants was floating on the top and the remaining 75% settled on the bottom. The volume of the 75% settled proppants was still significantly larger than the control one. When the bottles were tilted, the settled proppants in the bottle with straight water tended to move as individual grains, while the settled proppants containing Tegopren 6924 tended to move as cohesive masses.

EXAMPLE 4

100 ml of water and 50 grams of 40/70 mesh fracturing sand were added into each of two glass bottles (200 ml). 0.1 ml of Tegopren 6924 and 0.1 ml of TEGO Betaine 810, were added and further added 2 wt % KCl. The other bottle was used as control. The bottles were vigorously shaken and then let stand to allow sands settle down. The volumes of the settled sands in the two bottles were compared. In the bottle containing Tegopren 6924, about 15% of sands was floating on the top and the remaining 85% settled on the bottom. The volume of the 85% settled sand was still significantly larger than the control one. When the bottles were tilted, the settled sands in the bottle with straight water tended to move as individual grains, while the settled sands containing Tegopren 6924 tended to move as cohesive masses.

EXAMPLE 5

100 ml of water and 50 grams of 40/70 mesh fracturing sand were added into each of two glass bottles (200 ml). 0.5 ml of TEGO Betaine 810 and 1 ml of a solution containing 20% Tegopren 6924 and 80% of ethylene glycol mono-butyl ether were added into one of the bottles. After thoroughly mixing the sands were separated from the liquid and dried at room temperature. The pre-hydrophobonized sands were mixed with 100 ml water and shaken vigorously. In the bottle containing Tegopren 6924, about 40% of sands was floating on the top and the remaining 60% settled on the bottom. The volume of the 60% settled sand was still significantly larger than the control one. When the bottles were tilted, the settled sands in the bottle with straight water tended to move as individual grains, while the settled sands containing Tegopren 6924 tended to move as cohesive masses.

EXAMPLE 6

100 ml of water and 50 grams of coal particulates were added into each of two glass bottles (200 ml). 0.5 ml of TEGO Betaine 810 and 1 ml of a solution containing 20% Tegopren 6924 and 80% of ethylene glycol mono-butyl ether were added into one of the bottles. The other bottle was used as control. In the bottle containing Tegopren 6924, about 45% of coal particulates was floating on the top and the remaining 55% settled on the bottom. The volume of the 55% settled coal particulates was about 15% smaller than the control one.

EXAMPLE 7

100 ml of water and 50 grams of 40/70 mesh fracturing sand were added into each of two glass bottles (200 ml). 0.03 ml of Maquat QSX, a quaternary silane compound characterized as triethoxysilyl soyapropyl dimonium chloride in butylene glycol, was added into one of the bottles. The other bottle was used as control. After being thoroughly mixed the liquid above the settled sand was discarded and replaced with same amount of water. The bottles were vigorously shaken and then let stand to allow sands settle down. The volumes of the settled sands in the two bottles were compared. In the bottle containing Maquat QSX, about 5% of sands was floating on the top and remain 95% settled on the bottom. The volume of the 95% settled sand was still significantly larger than the control one. When the bottles were tilted, the settled sands in the bottle with straight water tended to move as individual grains, while the settled sands containing Maquat QSX tended to move as cohesive masses.

EXAMPLE 8

100 ml of water and 50 grams of 20/40 mesh resin coated sands were added into each of two glass bottles (200 ml). 0.5 ml of TEGO Betaine 810 and 1 ml of a solution containing 20% Tegopren 6924 and 80% of ethylene glycol mono-butyl ether were added into one of the bottles, and the other bottle was used as control. The bottles were vigorously shaken and then let stand to allow resin coated sands settle down. The volume of settled sands containing Tegopren 6924 is about twice of that in the control one.

As mentioned above, the present invention is particularly useful in many applications in the petroleum industry as well as in other industries. Examples include various well service operations including hydraulic fracturing, gravel pack, wellbore cleanout and drilling, particulate transportation through pipe lines and sand blasting.

When used in a hydraulic fracturing operation, a large amount of proppants can effectively be transported into subterranean formation without using a viscosifier. It is not only cost-effective but also eliminates damage to the formation and proppant pack caused by polymer residues. An EHRC, for example a di-quaternary polysiloxane can be added to a water-based fracturing fluid containing proppants to make the slurry and then pumped into the formation during the proppant stage. Various aqueous fracturing fluids including water, brine, linear polymer fluid, cross-linked polymer fluid and viscoelastic surfactant fluid can be used. It is particularly beneficial to use the slurry in so-called slick-water fracturing treatment. In conventional slick-water fracturing operations, due to the low viscosity of the fluid, only low concentration of proppants can be effectively pumped deep into a formation, and moreover the proppants tend to settle down on the bottom of the fracture, resulting in lower conductivity. With the composition of the present invention, high concentration of proppants can easily be pumped deep into a formation and the proppants are more evenly distributed in the fracture, leading to improved conductivity of the proppant pack. During the fracturing operation, the EHRC can be added on-the-fly. Optionally, one can use proppants already rendered extremely hydrophobic in the fracturing operation. Another benefit of the slurry of the present invention is that the fluid is readily re-useable after flow back from a well. This has great significance considering there is limited water supply in a number of places.

The present invention also provides a new method for preventing proppant flowback after a fracturing treatment. In field operations, proppants can be pumped into a formation using the composition of the present invention. Various aqueous fracturing fluid, for example water, brine, a linear polymer fluid, a cross-linked polymer fluid or a viscoelastic surfactant fluid can be used. Alternatively, a fluid medium containing an EHRC can be pumped into the formation following the proppant stage to mix with particulates already in the formation. The particulates in the slurry tend to move cohesively in contrast to conventional slurries under the same conditions. It is worth noting that the cohesiveness among the proppant grains in the present slurry originates from hydrophobic interactions, instead of tackiness as described, for example in U.S. Pat. No. 6,047,772.

The slurry of the present invention is particularly useful in gravel-pack operations where sand slurry is normally pumped into a wellbore to prevent excessive amount of sands from flowing into the wellbore from the formation. The present method is cost effective and the sand pack formed has a high conductivity. Similarly, the slurry can also be used in so-called formation consolidation operations. In such an operation, a fluid containing an EHRC is injected into a formation to increase cohesiveness among sand grains to consolidate the formation and to reduce sand production.

In drilling operations, an EHRC can be added directly to a water-based drilling fluid. It is particularly useful when the EHRC is added to water or brine for use as a drilling fluid. During a drilling operation, the fluid forms slurry in situ with cuttings and transports the cuttings out of the wellbore. A gas such as nitrogen or carbon dioxide can be mixed with the slurry during drilling. Since it is not necessary to use polymers or clays to viscosify the fluid, there is much less formation damage. Moreover, the cuttings can be easily removed on the surface and the fluid becomes readily re-useable. Different formations including sandstone, carbonate, shale and coal seams can be drilled using the slurry of the present invention.

Similarly in wellbore cleanout operations, water or brine containing an EHRC can circulate in the wellbore and form slurry with debris in situ. The debris is subsequently transported out of the wellbore as slurry. The fluid is readily re-useable after separation from the debris.

For transporting particulates through pipelines slurry can be prepared by mixing the ingredients and then pumping the slurry through the pipeline.

What is claimed is:

1. An aqueous slurry composition comprising:
   (a) water;
   (b) particulates ranging in size from 10 to 100 US mesh; and
   (c) a chemical compound for rendering the surface of the particulates extremely hydrophobic,
wherein the chemical compound is an organo-siloxane having the formula:

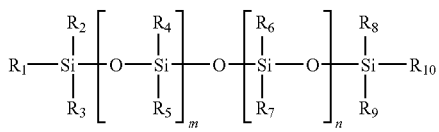

wherein each of $R_1$ to $R_6$ and $R_8$ to $R_{10}$, represents an organic radical containing 1-6 carbon atoms, typically a methyl group, $R_7$ represents an organic betaine group for an organic betaine polysiloxane or an organic guaternary group for an organic quaternary polysiloxane, and m and n are from 1 to 200.

2. The composition of claim 1, wherein the particulates are selected from the group consisting of sand, resin coated sand, ceramic, carbonate, bauxite, shale and coal particulates.

3. The composition of claim 1, wherein the particulates are subterranean formation particulates.

4. The composition of claim 1, wherein the chemical compound is an organic betaine polysiloxane.

5. The composition of claim 4, wherein the chemical compound is an organic betaine polysiloxane, and the values of m and n are from 1 to 100.

6. The composition of claim 5, wherein the chemical compound is an organic betaine polysiloxane, wherein each of $R_1$ to $R_6$ and $R_8$ to $R_{10}$ is a methyl group and the values of m and n are from 1 to 100.

7. The composition of claim 1, wherein the chemical compound is an organic quaternary polysiloxane.

8. The composition of claim 7, wherein the chemical compound is an organic quaternary polysiloxane, and the values of m and n are from 1 to 100.

9. The composition of claim 8, wherein the chemical compound is an organic quaternary polysiloxane, and each of $R_1$ to $R_6$ and $R_8$ to $R_{10}$ is a methyl group and the values of m and n are from 1 to 100.

10. An aqueous slurry composition comprising:
    (a) water;
    (b) particulates ranging in size from 10 to 100 US mesh; and
    (c) a chemical compound for rendering the surface of the particulates extremely hydrophobic,
wherein the chemical compound is an organo-siloxane having the formula:

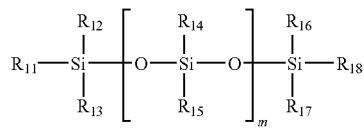

where $R_{12}$ to $R_{17}$ each represents an organic radical containing 1-6 carbon atoms, typically a methyl group, $R_{11}$ and $R_{18}$ each represents an organic betaine group for a di-betaine polysiloxane or an organic quaternary group for a di-quaternary polysiloxane, and m is 1 to 200.

11. The composition of claim 10, wherein the chemical compound is a di-betaine polysiloxane.

12. The composition of claim 11, wherein the chemical compound is a di-betaine polysiloxane and the values of m are from 1 to 100.

13. The composition of claim 12, wherein each of $R_{12}$ to $R_{17}$ represents a methyl group and the m is from 1 to 100.

14. The composition of claim 10, wherein the chemical compound is a di-quaternary polysiloxane.

15. The composition of claim 14, wherein the chemical compound is a di-quaternary polysiloxane, and the values of m are from 1 to 100.

16. The composition of claim 15, wherein each of $R_{12}$ to $R_{17}$ represents a methyl group and the m is from 10 to 100.

17. An aqueous slurry composition comprising:
    (a) water;
    (b) particulates ranging in size from 10 to 100 US mesh; and
    (c) a chemical compound for rendering the surface of the particulates extremely hydrophobic,
    wherein the composition further includes a gas.

18. The composition of claim 17, wherein the gas is selected from the group consisting of air, nitrogen, carbon dioxide, methane and mixtures thereof.

19. A method of producing an aqueous slurry composition comprising the step of mixing water, particulates and a chemical compound for rendering the surface of the particulates extremely hydrophobic, wherein the particulates range in size from 10 to 100 US mesh,
    wherein the chemical compound is selected from the group consisting of an organosilane, an organosiloxane, a fluoro-organosilane, a fluoro-organosiloxane and a fluoro-organic compound, and
    wherein the chemical compound is an organo-polysiloxane having the formula:

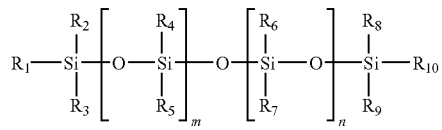

wherein each of $R_1$ to $R_6$ and $R_8$ to $R_{10}$, represents an organic radical containing 1-6 carbon atoms, typically a methyl group, $R_7$ represents an organic betaine group for an organic betaine polysiloxane or an organic guaternary group for an organic guaternary polysiloxane, and m and n are from 1 to 200.

20. The method of claim 19, wherein the particulates are selected from the group consisting of sand, resin coated sand, ceramic, carbonate, bauxite, shale and coal particulates.

21. The composition of claim 19, wherein the particulates are sands.

22. The composition of claim 19, wherein the chemical compound is an organo-siloxane having the formula:

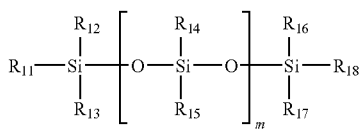

where $R_{12}$ to $R_{17}$ each represents an organic radical containing 1-6 carbon atoms, typically a methyl group, $R_{11}$ and $R_{18}$ each represents an organic betaine group for a di-betaine polysiloxane or an organic quaternary group for a di-quaternary polysiloxane, and m is 1 to 200.

23. The composition of claim 22, wherein the particulates are sands.

24. The method of claim 19, including the steps of contacting the particulate with a medium containing the chemical compound to render the particulate hydrophobic, separating the particulate from the medium; and blending the hydrophobic particulate with water.

25. The method of claim 24, wherein the gas is selected from the group consisting of air, nitrogen, carbon dioxide, methane and mixtures thereof.

26. A method of producing an aqueous slurry composition comprising the steps of mixing water, particulates and a chemical compound for rendering the surface of the particulates extremely hydrophobic; and subjecting the slurry composition to shear in the presence of a gas, wherein the particulates range in size from 10 to 100 US mesh.

27. The method of claim 26, wherein the gas is selected from the group consisting of air, nitrogen, carbon dioxide, methane and mixtures thereof.

28. A method of producing an aqueous slurry composition comprising the steps of mixing water, particulates and a chemical compound for rendering the surface of the particulates extremely hydrophobic; contacting the particulate with a medium containing the chemical compound to render the particulate hydrophobic; separating the particulate from the medium; blending the hydrophobic particulate with water; and subjecting the slurry composition to shear in the presence of a gas, wherein the particulates range in size from 10 to 100 US mesh.

29. A method of producing an aqueous slurry composition comprising the steps of mixing water, particulates and a chemical compound for rendering the surface of the particulates extremely hydrophobic; contacting the particulate with a medium containing the chemical compound to render the particulate hydrophobic; separating the particulate from the medium; blending the hydrophobic particulate with water, wherein the particulates range in size from 10 to 100 US mesh, wherein the chemical compound is an organo-polysiloxane having the formula:

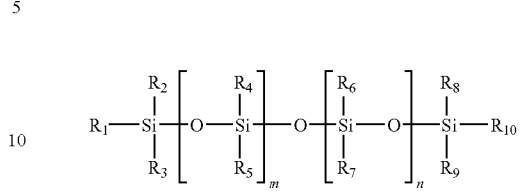

wherein each of $R_1$ to $R_6$ and $R_8$ to $R_{10}$, represents an organic radical containing 1-6 carbon atoms, typically a methyl group, $R_7$ represents an organic betaine group for an organic betaine polysiloxane or an organic quaternary group for an organic quaternary polysiloxane, and m and n are from 1 to 200.

30. The method of claim 29, wherein the particulates are sands.

31. A method of producing an aqueous slurry composition comprising the steps of mixing water, particulates and a chemical compound for rendering the surface of the particulates extremely hydrophobic; contacting the particulate with a medium containing the chemical compound to render the particulate hydrophobic; separating the particulate from the medium; blending the hydrophobic particulate with water, wherein the particulates range in size from 10 to 100 US mesh, wherein the chemical compound is an organo-siloxane having the formula:

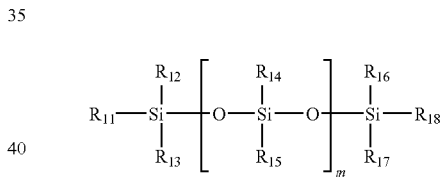

where $R_{12}$ to $R_{17}$ each represents an organic radical containing 1-6 carbon atoms, typically a methyl group, $R_{11}$ and $R_{18}$ each represents an organic betaine group for a di-betaine polysiloxane or an organic quaternary group for a di-quaternary polysiloxane, and m is 1 to 200.

32. The method of claim 31, wherein the particulates are sands.

33. A method of producing an aqueous slurry composition for a well service operation in various formations, comprising the step of mixing water, particulates and a chemical compound for rendering the surface of the particulates extremely hydrophobic; and subjecting the slurry composition to shear in the presence of a gas, wherein the particulates range in size from 10 to 100 US mesh.

34. The method of claim 33 wherein the well service operation is selected from the group consisting of hydraulic fracturing, drilling, completion and sand pack operation.

35. The method of claim 33, wherein the fluid can be re-used after separated from the particulates.

36. A method of producing an aqueous slurry composition for a well service operation in various formations, comprising the step of mixing water, particulates and a chemical compound for rendering the surface of the particulates extremely hydrophobic, wherein the particulates range in size from 10 to 100 US mesh, and wherein the chemical compound is an organo-polysiloxane having the formula:

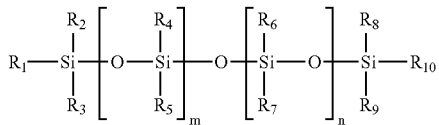

wherein each of $R_1$ to $R_6$ and $R_8$ to $R_{10}$, represents an organic radical containing 1-6 carbon atoms, typically a methyl group, $R_7$ represents an organic betaine group for an organic betaine polysiloxane or an organic quaternary group for an organic quaternary polysiloxane, and m and n are from 1 to 200.

37. A method of producing an aqueous slurry composition for a well service operation in various formations, comprising the step of mixing water, particulates and a chemical compound for rendering the surface of the particulates extremely hydrophobic, wherein the particulates range in size from 10 to 100 US mesh, and wherein the chemical compound is an organo-siloxane having the formula:

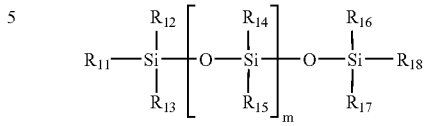

where $R_{12}$ to $R_{17}$ each represents an organic radical containing 1-6 carbon atoms, typically a methyl group, $R_{11}$ and $R_{18}$ each represents an organic betaine group for a di-betaine polysiloxane or an organic quaternary group for a di-quaternary polysiloxane, and m is 1 to 200.

38. A method of producing an aqueous slurry composition for transporting particulates through a pipeline, comprising the step of mixing water, particulates and a chemical compound for rendering the surface of the particulates extremely hydrophobic, and pumping the slurry through the pipeline.

39. The method of claim 38, wherein the particulates are sands.

40. The method of claim 38, wherein the particulates are coal particulates

* * * * *

UNITED STATES PATENT AND TRADEMARK OFFICE
CERTIFICATE OF CORRECTION

PATENT NO. : 7,723,274 B2
APPLICATION NO. : 11/416704
DATED : May 25, 2010
INVENTOR(S) : Kewei Zhang Page 1 of 1

It is certified that error appears in the above-identified patent and that said Letters Patent is hereby corrected as shown below:

In the Specification:
Column 7, line 22: After "U.S. Pat. Nos." delete "4,054,161;".
Column 8, line 28: Delete "fended" and replace with -- tended --.

In the Claims:
Column 11, line 41: After "organic" delete "guarternary" and replace with -- quarternary --.
Column 13, line 2: Delete "guarternary" and replace with -- quarternary --.
Column 13, line 3: Delete "guarternary" and replace with -- quarternary --.

Signed and Sealed this

Twentieth Day of July, 2010

David J. Kappos
*Director of the United States Patent and Trademark Office*